3,078,920
TREATING UNDERGROUND FORMATIONS
Karl C. ten Brink, Houston, Tex., assignor to
Texaco Inc., a corporation of Delaware
No Drawing. Filed Jan. 26, 1959, Ser. No. 788,714
8 Claims. (Cl. 166—33)

This invention relates to the treatment of underground formations. More particularly, this invention relates to a method of treating permeable underground formations to reduce the porosity and permeability thereof and/or to render the same more competent. In accordance with one embodiment this invention is directed to a method of treating permeable underground formations to reduce the water permeability thereof.

It is known to treat underground formations to render the same substantially impermeable. One practice employed heretofore has been to inject liquid cement into permeable formations and then to permit the cement to set therein. A formation so treated is rendered substantially fluid impermeable.

Another method practiced heretofore has been to inject into an underground permeable formation one treating solution, followed by another treating solution, and permitting the thus-introduced treating solutions to react with each other within the formation with the eventual deposition of solid materials thereon, thereby reducing the porosity or plugging the thus-treated formation.

Each of the foregoing methods of plugging or reducing the porosity and/or permeability of underground formations has some disadvantage. For example, it is difficult to inject liquid cement into relatively tight formations. Further, cement plugging is sometimes difficult to control. Also, the use of two treating solutions to plug a formation is not usually completely satisfactory due to a skin-plugging effect predominant at the interface of the treating solutions within the formation. Further, when two treating solutions are employed an intimate admixture of these solutions within the formation undergoing treatment to insure a satisfactory and complete reaction of the treating solutions is difficult to obtain.

Accordingly it is an object of this invention to provide an improved method for treating permeable underground formations to reduce the porosity and permeability thereof, particularly the water permeability thereof.

Still another object of this invention is to provide a method whereby a single, homogeneous treating solution is employed to plug or to effect at least a partial reduction in the porosity and/or permeability of an underground formation.

Still another object of this invention is to provide a formation plugging method or a method of reducing the porosity of permeable formations wherein there is caused to be deposited within the pores of interstices of the formation a substantially oil-insoluble and water-insoluble solid material.

How these and other objects of this invention are accomplished will become apparent with reference to the accompanying disclosure. In at least one embodiment of the practice of this invention at least one of the foregoing objects will be achieved.

It has now been discovered that an improved method of treating an underground formation is obtained by introducing into said formation a solution of a normally solid, polymerized methacrylate (polymethacrylate). A normally solid, polymerized methacrylate particularly useful in the practice of this invention is a polymerized methyl methacrylate. Exemplary of a suitable polymerized methyl methacrylate is Lucite, a well known, commercially available polymerized methacrylate.

Any water miscible solvent effective to dissolve polymerized methacrylate may be employed in the practice of this invention. Solvents suitable for dissolving a normally solid polymerized methacrylate as employed in the practice of this invention include glacial acetic acid, acetic anhydride and anhydrous propionic acid. Other suitable solvents are the normally liquid aliphatic ketones, such as acetone, methyl ethyl ketone and the like. Other organic solvents for the preparation of methacrylate solutions are known and are suitable for use in the practice of this invention.

It is preferred to employ methacrylate solutions which are relatively concentrated, such as solutions wherein the methacrylate content comprises at least about 5% by wt. of the solution. Less concentrated solutions, such as a solution containing 1–5% by wt. polymerized methacrylate dissolved therein, are also useful, particularly for rendering formations more competent. It is to be pointed out that the solutions satisfactorily employed in the practice of this invention are anhydrous solutions.

Various underground formations are suitably treated in accordance with the practice of this invention so as to alter or reduce the porosity and/or permeability thereof or to render the formations more competent. Formations which are suitably treated include oil-producing formations, water-producing formations and oil-water-producing formations. The practice of this invention is particularly suitable for the treatment of water-producing formations to reduce the water permeability thereof and for the treatment of oil-producing formations which simultaneously produce water or formation brine. In accordance with one embodiment the practice of this invention is applicable to reduce or avoid water coning such as sometimes arises when an oil-producing formation is produced via a well bore at a location adjacent or close to a water-producing formation or a highly water permeable formation and wherein during the production of oil water in excessive amounts is also produced. Accordingly the practice of this invention is particularly useful for the treatment of substantially water saturated formations such as formations saturated with water to a substantial extent, e.g. 75% or more. The practice of this invention is also particularly satisfactory in the treatment of substantially oil saturated formations such as formations wherein the oil saturation amounts to about 75%, more or less.

In a treatment of an underground formation in accordance with the practice of this invention to inhibit or eliminate water coning and/or to reduce the water permeability thereof there is introduced into the formation, such as an oil-producing formation, at or near the zone of oil production, or into the water-producing formation itself which is usually adjacent the oil-producing formation, a suitable amount of the treating solution, such as a solution of polymerized methyl methacrylate at a temperature in the range 50–200° F., in an amount to substantially reduce the water permeability of that portion of the formation into which the treating solution has been injected. Usually an amount of treating solution sufficient to treat the formation for a distance 5–100 radial feet, more or less, from the point or area of injection is sufficient.

The following examples are illustrative of the practice of this invention.

EXAMPLE NO. 1

Illustrative of the effectiveness of a solution of a normally solid polymerized methacrylate as a plugging agent, a 2.5% by wt. solution of polymerized methyl methacrylate in glacial acetic acid was prepared. To amounts of this solution at various temperatures in the range 68–212° F. water was added. Immediately upon the addition of water to these solutions a precipitate of solid polymerized methyl methacrylate was formed. To other samples of this solution crude oil was added. It was observed that no precipitate was formed upon the addition of crude oil. However, upon the addition of water to those test solutions containing added crude oil a precipitate of polymerized methyl methacrylate was immediately formed.

EXAMPLE NO. 2

In these tests sand packs were treated by the injection thereinto of a solution of methyl methacrylate polymer in glacial acetic acid; more particularly, into each sand pack there was introduced 50 ccs. of a 4.8% by wt. glacial acetic acid solution of polymerized methyl methacrylate (Lucite). The results of these tests are set forth in accompanying Table I.

Table I

| Sand pack | A | B |
|---|---|---|
| Pore vol., cc | 120.6 | 121.0 |
| Temperature, 140° F | $S_w$, 100% | $S_o$, 16% / $S_w$, 84% |
| $K_w$, darcys | 9.63 | |
| Effective $K_w$, darcys | | 3.71 |
| $K_w$ after injection, darcys | 1.79 | 2.57 |
| Permeability reduction, percent | 81.4 | 30.7 |

EXAMPLE NO. 3

In these tests acetone solutions of polymerized methyl methacrylate containing varying amounts (5, 10 and 20% by wt.) methacrylate polymer were employed. In these tests permeability test cells 100% water saturated at 78° F. were employed. The results obtained are set forth hereinbelow.

TEST CELL C
Properties:
Length _____cm__ 28
Area _____cm.²__ 11.45
Bulk volume _____cc__ 320.6
Pore volume _____cm.³__ 105.5
Porosity _____percent__ 32.4

| | Polymer, gms. | $K_w$, darcys | Permeability reduction, percent |
|---|---|---|---|
| Initial Permeability | | 7.5 | |
| 1st Injection—25 cc. of 5% solution | 1.1175 | 4.475 | 40.3 |
| 2nd Injection—25 cc. of 5% solution | 1.1175 | 4.68 | −4.5 |
| 3rd Injection—25 cc. of 5% solution | 1.1175 | 3.86 | 17.5 |
| Cumulative reduction | | | 48.5 |

TEST CELL D
Properties:
Length _____cm__ 28.4
Area _____cm.²__ 11.45
Bulk volume _____cc__ 325.18
Pore volume _____cc__ 108
Porosity _____percent__ 33.2

| | Polymer, gms. | $K_w$, darcys | Permeability reduction, percent |
|---|---|---|---|
| Initial Permeability | | 7.02 | |
| 1st Injection—25 cc. of 10% solution | 2.235 | 4.16 | 40.75 |
| 2nd Injection—25 cc. of 10% solution | 2.235 | 2.81 | 32.5 |
| 3rd Injection—21.6 cc. of 10% solution | 1.931 | 2.67 | 5.0 |
| Cumulative reduction | | | 62.0 |

TEST CELL E
Properties:
Length _____cm__ 27.7
Area _____cm.²__ 11.45
Bulk volume _____cc__ 317.16
Pore volume _____cc__ 107.5
Porosity _____percent__ 38.75

| | Polymer, gms. | $K_w$, darcys | Permeability reduction, percent |
|---|---|---|---|
| Initial Permeability | | 7.75 | |
| 1st Injection—18.6 cc. of 20% solution | 3.16 | 4.6 | 40.7 |
| 2nd Injection—4.5 cc. of 20% solution | .765 | .557 | 87.7 |
| Cumulative reduction | | | 93 |

EXAMPLE NO. 4

In another test 10% methyl methacrylate polymer-acetone solution was injected into a sand pack having a high oil and low water saturation. The reduction in permeability was determined after 7 days water backflow. The results of these tests are set forth hereinbelow.

TEST CELL F
Properties:
Length _____cm__ 27.7
Area _____cm.²__ 11.45
Bulk volume _____cc__ 314.8
Pore volume _____cc__ 103.06
Porosity _____percent__ 32.7
Temperature _____° F__ 80
$S_o$ _____percent__ 82.7
$S_w$ _____do____ 17.3

Initial permeability_____$K_w$, darcys__ 5.2
$K_w$, darcys after injection of 55 cc. solution
_____do____ 1.135
Permeability reduction_____percent__ 78.0

EXAMPLE No. 5

In another test, comparable to the test set forth in Example No. 4, a sand pack having a high oil and low water saturation was treated by the injection thereinto of a methyl methacrylate polymer-acetone solution. The oil permeability was determined by backflow with oil. The results of this test are set forth herein below.

TEST CELL G
Properties:
Length _____cm__ 28
Area _____cm.²__ 11.5
Bulk volume _____ 320.6
Pore volume _____ 124.2
Porosity _____ 38.7
$S_w$ _____percent__ 25.8
$S_o$ _____do__ 74.2

$K_o$, darcys
Initial effective permeability_____ 1.31
1st injection—50 cc. of 10% solution.
First day permeability_____ 2.5
Seventh day permeability_____ 1.3
Average _____ 1.82

The permeability of oil of the test cell had increased after treatment and then decreased. The oil employed was a 38.4° A.P.I. crude and it was thought that some of the constituents of the crude oil had volatilized or oxidized with time causing an increase in viscosity.

As will be apparent to those skilled in the art many modifications, substitutions and alterations are possible in the practice of this invention without departing from the spirit or scope thereof.

I claim:
1. A method for treating an underground water-containing formation in order to reduce the water permeability thereof which comprises as a single treating step introducing into said formation an anhydrous solution of polymerized methyl methacrylate in a water-miscible solvent, said solution containing at least 1 percent by weight of said polymerized methyl methacrylate whereby said polymerized methyl methacrylate is precipitated on contacting the water in said formation.

2. A method in accordance with claim 1 wherein said solvent is glacial acetic acid.

3. A method in accordance with claim 1 wherein said solvent is acetic anhydride.

4. A method in accordance with claim 1 wherein said solvent is anhydrous propionic acid.

5. A method in accordance with claim 1 wherein said solvent is an aliphatic ketone.

6. A method in accordance with claim 5 wherein said solvent is acetone.

7. A method in accordance with claim 5 wherein said solvent is methyl ethyl ketone.

8. A method of treating an underground water-containing formation in order to reduce the water permeability thereof which comprises as a single treating step introducing into said formation an anhydrous solution of a methacrylate polymer in a water-miscible organic solvent, said solution containing at least 1 percent by weight of said methacrylate polymer whereby said methacrylate polymer is precipitated on contacting the water in said formation.

References Cited in the file of this patent

UNITED STATES PATENTS

| | | |
|---|---|---|
| 2,348,484 | Lawton | May 9, 1944 |
| 2,670,048 | Menaul | Feb. 23, 1954 |
| 2,747,671 | Nowak et al. | May 29, 1956 |
| 2,842,206 | Bearden et al. | July 8, 1958 |
| 2,896,717 | Howard | July 28, 1959 |
| 2,946,383 | Bearden et al. | July 26, 1960 |